United States Patent
Turco et al.

(10) Patent No.: US 11,939,170 B2
(45) Date of Patent: Mar. 26, 2024

(54) DEVICES, SYSTEMS, AND METHODS FOR ARTICLE RETRIEVAL

(71) Applicant: INTELLIGRATED HEADQUARTERS, LLC, Mason, OH (US)

(72) Inventors: Anthony Turco, Mason, OH (US); Jarl Nicholas Sebastian, Mason, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 17/363,225

(22) Filed: Jun. 30, 2021

(65) Prior Publication Data

US 2023/0002168 A1    Jan. 5, 2023

(51) Int. Cl.
*B65G 1/04*        (2006.01)
*B65G 1/137*       (2006.01)
*B65G 43/08*       (2006.01)

(52) U.S. Cl.
CPC ........... *B65G 43/08* (2013.01); *B65G 1/0492* (2013.01); *B65G 1/1371* (2013.01); *B65G 2203/0233* (2013.01); *B65G 2203/044* (2013.01)

(58) Field of Classification Search
CPC ..... B65G 1/0492; B65G 43/08; B65G 1/1371
See application file for complete search history.

(56) References Cited

U.S. PATENT DOCUMENTS

| | | | | |
|---|---|---|---|---|
| 2015/0032252 A1* | 1/2015 | Galluzzo | ............... | B60P 1/5423 700/218 |
| 2015/0081089 A1* | 3/2015 | Kapust | ................. | B65G 1/1373 700/218 |
| 2017/0137221 A1* | 5/2017 | Koide | ................. | B65G 1/0492 |
| 2017/0260008 A1 | 9/2017 | Dewitt et al. | | |
| 2017/0313512 A1* | 11/2017 | Miyagawa | ............. | B65G 1/065 |
| 2019/0177088 A1 | 6/2019 | Sullivan et al. | | |

FOREIGN PATENT DOCUMENTS

| | | |
|---|---|---|
| CN | 104828553 A | 8/2015 |
| JP | 2016-155651 A | 9/2016 |
| WO | 2011/158422 A1 | 12/2011 |
| WO | 2012/083057 A1 | 6/2012 |

OTHER PUBLICATIONS

European search report and Search opinion dated Nov. 30, 2022 for EP Application No. 22179551.

* cited by examiner

*Primary Examiner* — Saul Rodriguez
*Assistant Examiner* — Willie W Berry, Jr.
(74) *Attorney, Agent, or Firm* — Alston & Bird LLP

(57) ABSTRACT

Devices, methods, and computer program products for article retrieval are provided. An example article retrieval device includes a frame and a pair of loading arms movably attached to the frame that move between a retracted position and an extended position. The device includes an engagement structure movably attached to at least one of the pair of loading arms that moves between a stored position and a deployed position. The device further includes a sensing device coupled with the pair of loading arms and a computing device operably coupled with the pair of loading arms, the at least one engagement structure, and the sensing device. The computing device causes the pair of loading arms to extend from the retracted position to a position proximate a first article and deploys the at least one engagement structure based upon sensor data generated by the sensing device.

16 Claims, 13 Drawing Sheets

DEVICES, SYSTEMS, AND METHODS FOR ARTICLE RETRIEVAL

TECHNOLOGICAL FIELD

Example embodiments of the present disclosure relate generally to material handling systems and, more particularly, to systems and apparatuses for improved article retrieval.

BACKGROUND

Warehouses, distribution centers, and other material handling environments often rely on a number of components, systems, and the like for transporting items to and from various locations within these environments. During movement of the items, various systems (e.g., shuttles, conveyors, robotic arms, or the like) may be used to reorient, position, and/or redirect these items. However, the inventors have identified numerous deficiencies with these existing technologies in the field, the remedies for which are the subject of the embodiments described herein.

BRIEF SUMMARY

Devices, methods, systems, and associated computer program products are provided for article retrieval. An example article retrieval device may include a frame and a pair of loading arms movably attached to the frame. The pair of loading arms may be configured to move between a retracted position proximate the frame and an extended position in which a portion of the pair of loading arms extends at least partially beyond an outer edge of the frame. The device may further include at least one engagement structure movably attached to at least one of the pair of loading arms that may move between a stored position and a deployed position. The device may also include a sensing device coupled with the pair of loading arms and a computing device operably coupled with the pair of loading arms, the at least one engagement structure, and the sensing device. The computing device may be configured to cause the pair of loading arms to extend from the retracted position to a position proximate a first article and deploy the at least one engagement structure based upon sensor data generated by the sensing device.

In some embodiments, the pair of loading arms may define a first loading arm and a second loading arm. The second loading arm may be substantially parallel with respect to the first loading arm.

In some further embodiments, the sensing device may further include a first sensing element supported by the first loading arm and a second sensing element supported by the second loading arm.

In some embodiments, the sensing device may include a photoelectric sensor.

In some further embodiments, the at least one engagement structure may include a first engagement structure movably attached to the first loading arm and a second engagement structure movably attached to the second loading arm.

In some further embodiments, in the stored position, the first engagement structure and the second engagement structure may be positioned substantially parallel with respect to the first loading arm and the second loading arm, respectively. In the deployed position, the first engagement structure and the second engagement structure may be positioned perpendicular with respect to the first loading arm and the second loading arm, respectively.

In some embodiments, the first engagement structure may further define a first pair of arms and the second engagement structure may further define a second pair of arms such that, in the deployed position, the first engagement structure and the second engagement structure are collectively configured to bound the first article.

In some embodiments, the computing device may be further configured to receive first article data indicative of at least a dimension associated with the first article and cause the pair of loading arms to extend from the retracted position to a first position from the frame based upon the dimension. The computing device may be further configured to deploy the at least one engagement structure in an instance in which the sensor data generated by the sensing device indicates that the sensing device is unimpeded.

In some further embodiments, in an instance in which the sensor data generated by the sensing device indicates that the sensing device is impeded, the computing device may be further configured to cause the pair of loading arms to extend from the first position to a second position from the frame that is greater than the first position. The computing device may be configured to further deploy the at least one engagement structure in an instance in which the sensor data generated by the sensing device indicates that the sensing device is unimpeded.

In an instance in which the sensor data generated by the sensing device indicates that the sensing device is impeded at the second position, the computing device may be further configured to generate an alert notification.

In an instance in which the sensor data generated by the sensing device indicates that the sensing device is impeded at the second position, the computing device may be further configured to modify the first article data associated with the first article In an instance in which the sensor data generated by the sensing device indicates that the sensing device is impeded at the second position, the computing device may be further configured to modify second article data associated with a second article.

In some embodiments, the computing device may be further configured to receive first article data indicative of at least a dimension associated with the first article and cause the pair of loading arms to extend from the retracted position to a first position from the frame based upon the dimension. The computing device may further determine, based upon sensor data generated by the sensing device, that the sensing device is unimpeded at the first position and cause the pair of loading arms to extend from the first position to a second position from the frame that is greater than the first position. The computing device may further determine, based upon sensor data generated by the sensing device, that the sensing device is unimpeded at the second position and deploy the at least one engagement structure at the first position.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
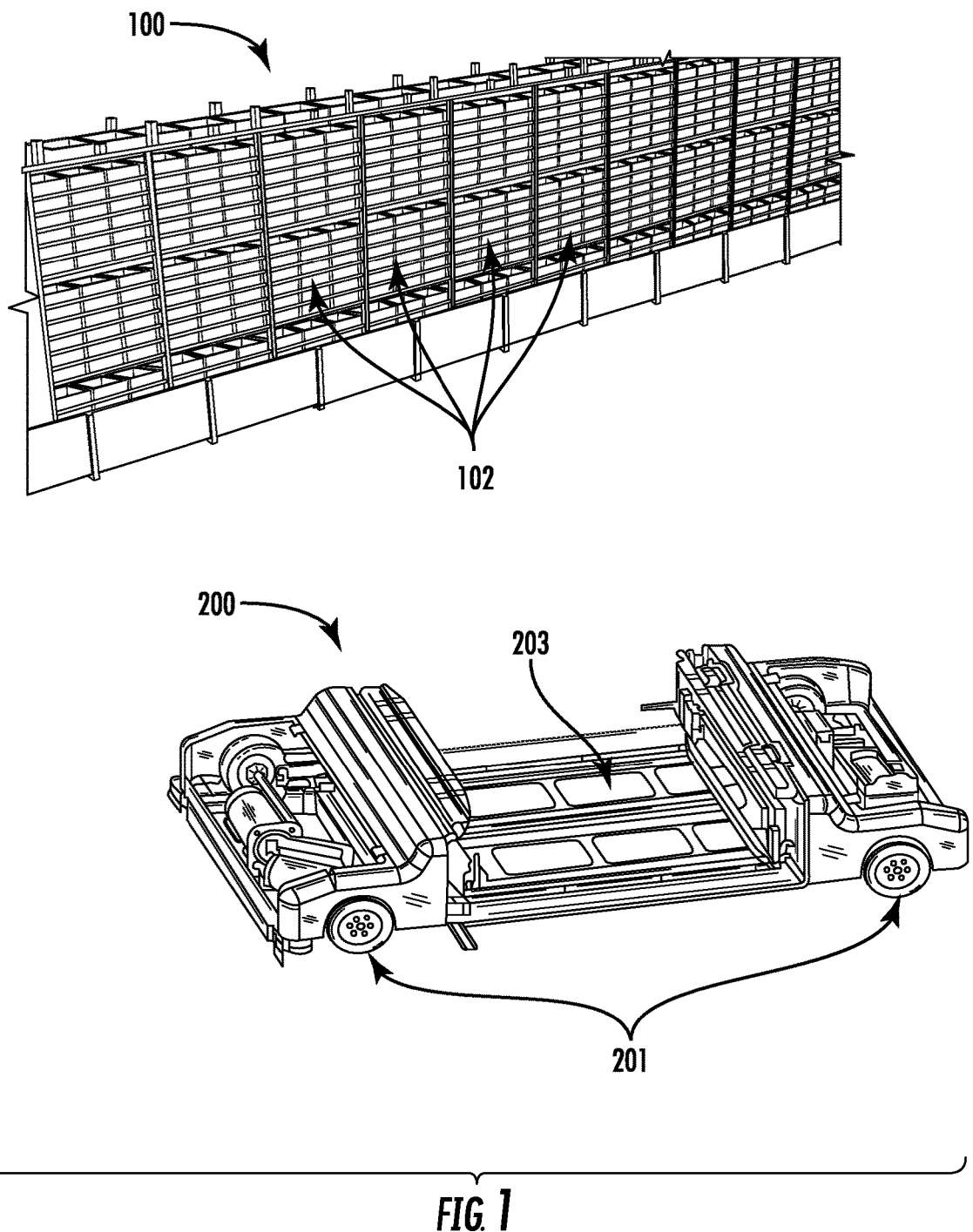
FIG. 1 illustrates an example automated storage and retrieval system (ASRS) for implementing an example article retrieval device in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first device is described herein to receive data from a second device, it will be appreciated that the data may be received directly from the second device or may be received indirectly via one or more intermediary computing devices, such as, for example, one or more servers, relays, routers, network access points, base stations, hosts, and/or the like, sometimes referred to herein as a "network." Similarly, where a first device is described herein as sending data to a second device, it will be appreciated that the data may be sent directly to the second device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Article Retrieval Device

With reference to FIG. 1, an example ASRS system 100 is illustrated with which example article retrieval devices 200 of the present disclosure may be implemented. As shown, an ASRS system 100 may include a plurality of articles 102 (e.g., containers, units, boxes, products, etc.) that may be collectively stored in shelves, racks, or other storage locations. By way of example, the ASRS 100 may operate as an automated or semi-automated warehousing system in which articles may be stored, retrieved, moved, and/or the like in response to system instructions or user interactions. The ASRS 100 may leverage one or more shuttles, cranes, lifts, elevators, modules, loading systems, robotic arms, and/or the like such that, as described hereafter, the article retrieval device 200 of the present disclosure may cooperate with one or more of the aforementioned devices or systems to improve upon operation of the ASRS system 100. For example, the article retrieval device 200 may include motorized wheels or an equivalent mechanism configured to cause movement of the article retrieval device 200 about the plurality of articles 102 in order to retrieve or pick an article.

By way of example, the ASRS system 100 may store a plurality of articles 102 in a system of racks (e.g., rack 104 in FIG. 2) such that the articles 102 may be retrieved when requested. In operation, however, articles 102 may be mispositioned (e.g., turned, moved, etc.) such that the actual location of these articles differs from the locations known to the system 100. For example, when an article 102 is stored, article data associated with the article may be stored (e.g., by a computing device 300, memory, or other related storage device) such that, when a command to retrieve the respective article 102 is received, the system 100 may properly retrieve the article 102 from the location at which it is stored. In this way, article data may include data entries indicative of the dimensions (e.g., length, width, height, cross-sectional area, shape, etc.) of the article 102 as well as the relative position of the article 102 within the system 100 (e.g., the article's relative position within the rack).

As described above, however, the article 102 may be mispositioned during operation such that, in conventional systems, attempts to retrieve the article fail. Said differently, in instances in which an article 102 positioned within a rack or other storage system differs from the location known to the system 100, attempts by conventional systems to retrieve or pick the article 102 may damage system components. Alternatively, attempts by conventional systems to pick a mispositioned article 102 may result in a faulted state in which operation of the system 100 halts until the article 102 is repositioned. Such faulted states result in reduced throughput of the system 100 and further inefficiencies associated with required repositioning of the article 102. Accordingly, the article retrieval device 200 described hereafter is configured to determine articles 102 that are mispositioned and, in response, modify operation of the device 200 so as to properly retrieve or pick these articles. Although described hereafter with reference to an ASRS system 100, the present disclosure contemplates that the devices described herein may be applicable to any other application in which an item, article, object, etc. is moved.

With reference to FIGS. 2-6, a top view of the article retrieval device 200 of the present disclosure is illustrated proximate a rack 104 of, for example, an ASRS system 100. As shown, the article retrieval device 200 may include a frame 203 upon which articles (e.g., article 102) may be supported. By way of example, the frame 203 may be formed of a plurality of members having any dimension (e.g., size and shape) as specified by the applicable system 100 and may be configured to support one or more elements of the article retrieval device 200. Following a retrieval operation as described hereafter, the frame 203 may be configured to house, enclose, or otherwise support the retrieved article 102 thereon for movement to another location within the system 100.

Figure 2:
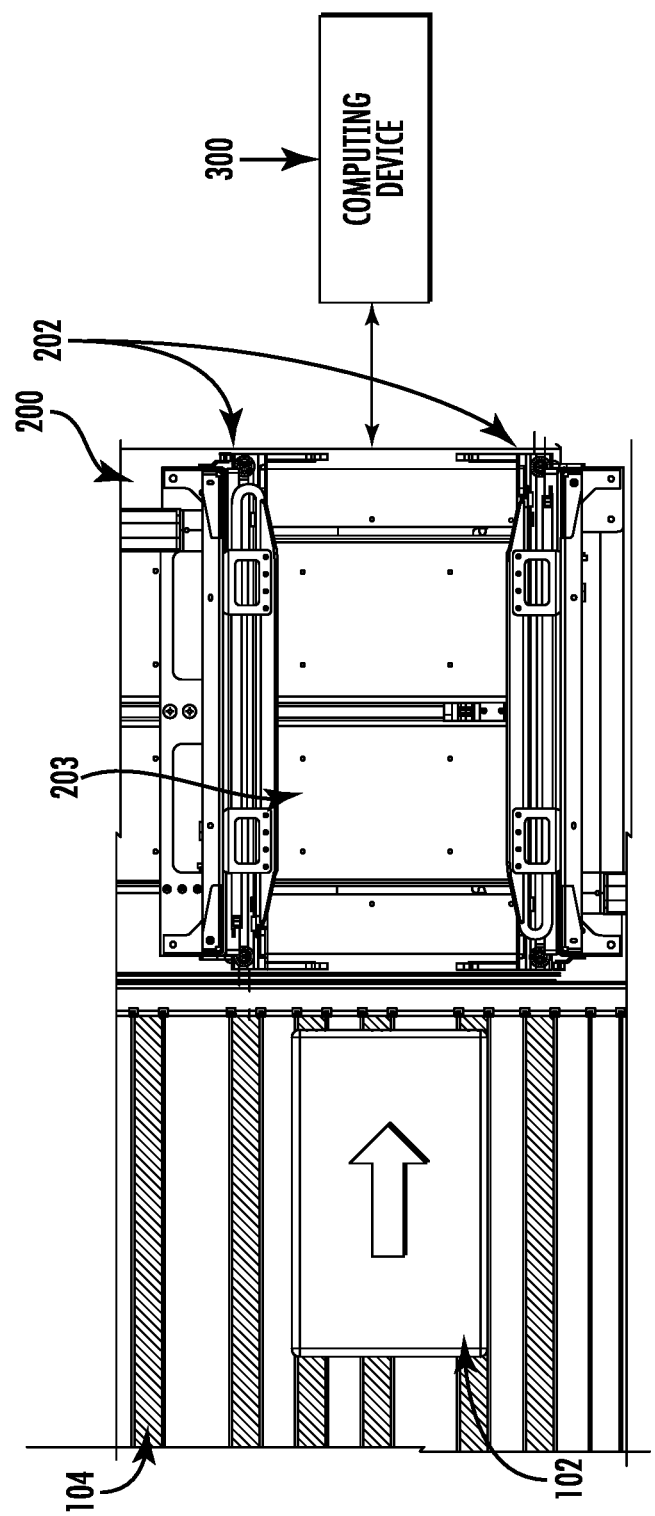
FIG. 2 illustrates a top view of an example article retrieval device with loading arms in a retracted position in accordance with some example embodiments described herein.

The article retrieval device 200 may further include a pair of loading arms 202 that are movably attached to the frame 203. The pair of loading arms 202 may be configured or otherwise dimensioned (e.g., sized and shaped) to move between a retracted position proximate the frame 203 as shown in FIG. 2 to an extended position as shown in FIGS. 3-6. The pair of loading arms 202 may, for example, be configured as nesting sections that, in the retracted position, nest in one another. In some embodiments, the pair of loading arms 202 may alternatively or additionally be formed of one or more sections that sequentially stack so as to be contained with the frame 203 (e.g., without extending beyond an outer edge of the frame 203). In some embodiments, the one or more loading arms 202 may be formed as single, integral members whose dimensions coincide with or otherwise match a corresponding dimension of the frame 203 such that a stacking or nesting feature is unnecessary. In any embodiment, the pair of loading arms 202 may have any dimension (e.g., size and shape) based upon the intended application of the article retrieval device 200 and/or the corresponding dimensions of the article 102 to be retrieved.

Figure 3:
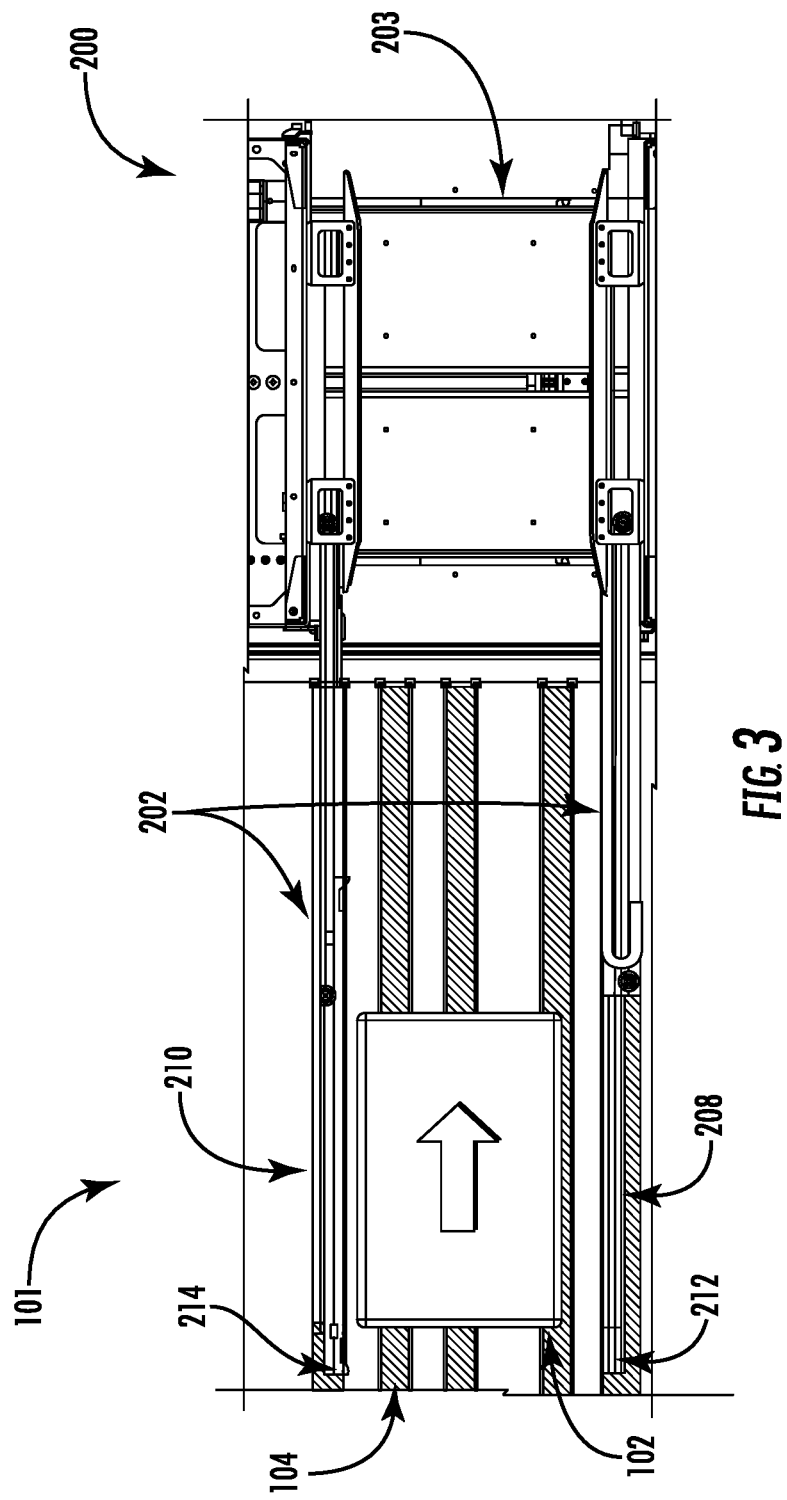
FIG. 3 illustrates the article retrieval device of FIG. 2 with loading arms in an extended position and engagement structures in a stored position in accordance with some example embodiments described herein.
Figure 4:
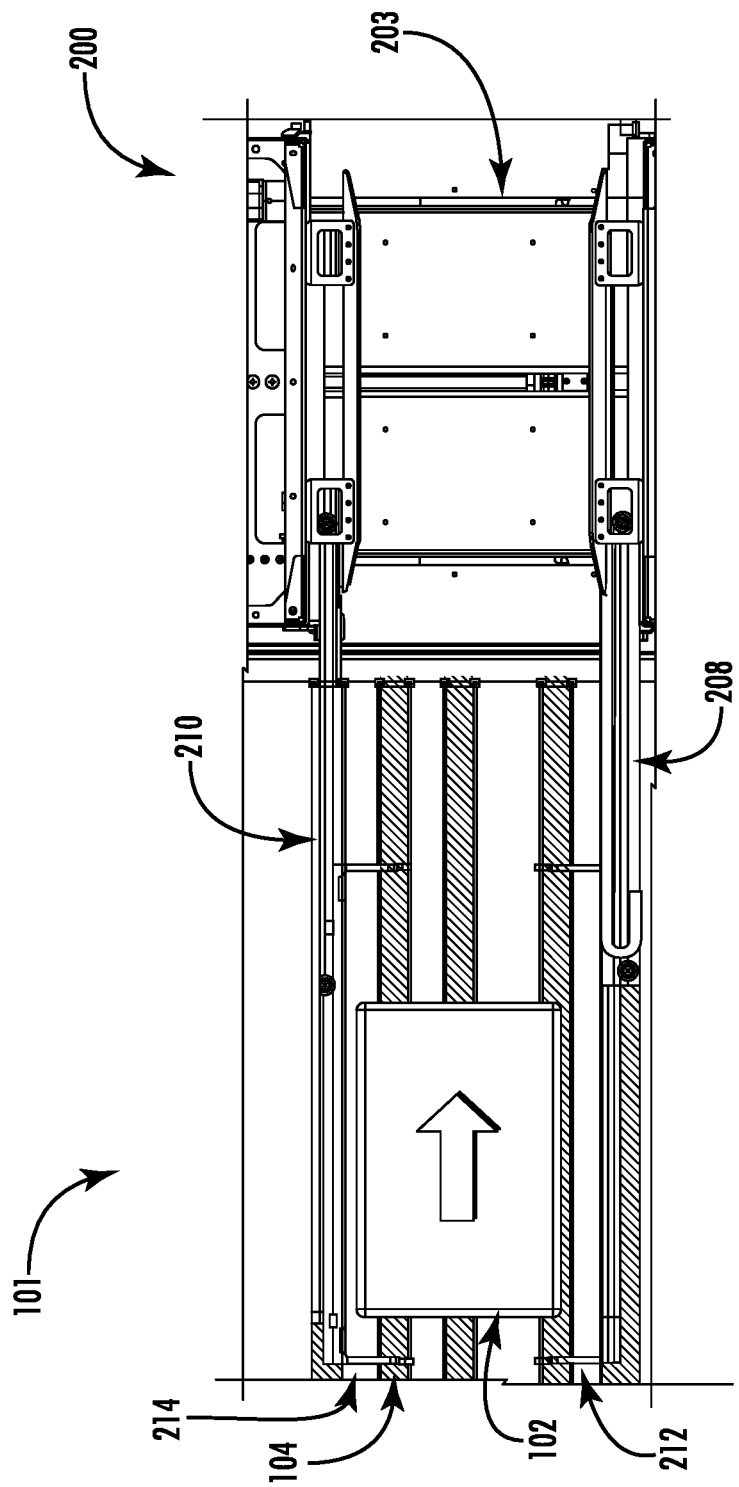
FIG. 4 illustrates the article retrieval device of FIG. 3 with engagement structures in a deployed position in accordance with some example embodiments described herein.

As shown in FIG. 3, for example, the pair of loading arms 202 may be configured to move from the retracted position illustrated in FIG. 2 to an extended position in which a portion of the pair of loading arms 202 extends at least partially beyond an outer edge of the frame 203. During operation, as described hereafter with reference to FIGS. 8, 10, and 12, the article retrieval device 200 may, for example, receive article data associated with the article 102 (e.g., from a computing device 300 or otherwise) indicative of the position or dimensions associated with the article 102. As such, the extension of the pair of loading arms 202 may, in some embodiments, be from the retracted position to a first position from the frame 203 based upon the received article data. For example, the pair of loading arms 202 may extend to a first position proximate the article 102 so as to, as described hereafter, retrieve the article 102. In some embodiments as illustrated herein, the pair of loading arms 202 may define a first loading arm 208 and a second loading arm 210 that may, for example, be positioned parallel with respect to one another. Said differently, the second loading arm 210 may be substantially parallel with respect to the first loading arm 208.

Although described hereinafter with reference to two loading arms (e.g., first loading arm 208 and second loading arm 210), the present disclosure contemplates that the pair of loading arms 202 may include any number of members, elements, etc. at any position or orientation based upon the intended application of the article retrieval device 200. For example, in instances in which additional articles are simultaneously retrieved by the loading arms 202, additional loading arms may similarly extend from the frame 203. Furthermore, the present disclosure contemplates that the pair of loading arms 202 may be operably connected to one or more motors, rollers, or equivalent mechanisms for causing motion of the pair of loading arms 202 between the retracted and extended positions. Said differently, the article retrieval device 200 may include any number of devices, structures, etc. to cause, for example, translation of the pair of loading arms 202 relative the frame 203.

In order to effectuate movement of the article 102, the article retrieval device 102 may include at least one engagement structure 212, 214 movably attached to at least one of the pair of loading arms 202. The at least one engagement structure 212, 214 may, for example, include a first engagement structure 212 movably attached to the first loading arm 208 and a second engagement structure 214 movably attached to the second loading arm 210. As shown in FIG. 3, the engagement structure 212, 214 may be positioned in a stored position so as to allow movement of the pair of loading arms 202 proximate the article 102. By way of example, in some embodiments in the stored position, the first engagement structure 212 and the second engagement structure 214 may be positioned substantially parallel with respect to the first loading arm 208 and the second loading arm 210, respectively. In doing so, the first loading arm 208 and the second loading arm 210 may extend past the article 102 such that, when deployed as described hereafter, the engagement structures 212, 214 may properly engage the article 102.

Figure 5:
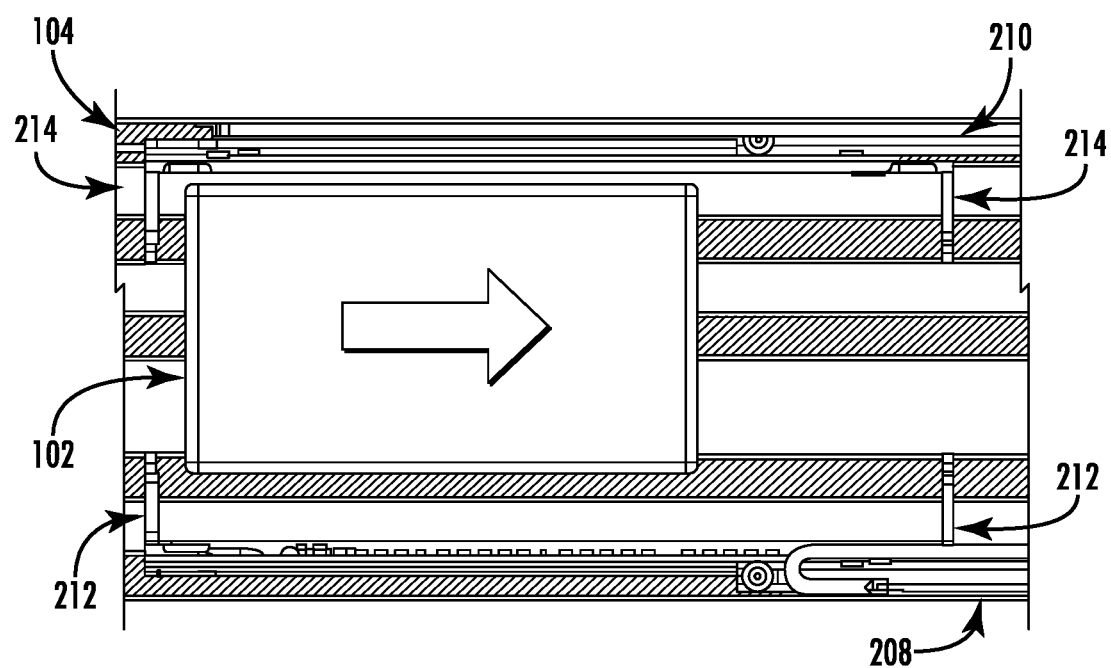
FIG. 5 illustrates a portion of the article retrieval device of FIG. 4 in accordance with some example embodiments described herein.
Figure 6:
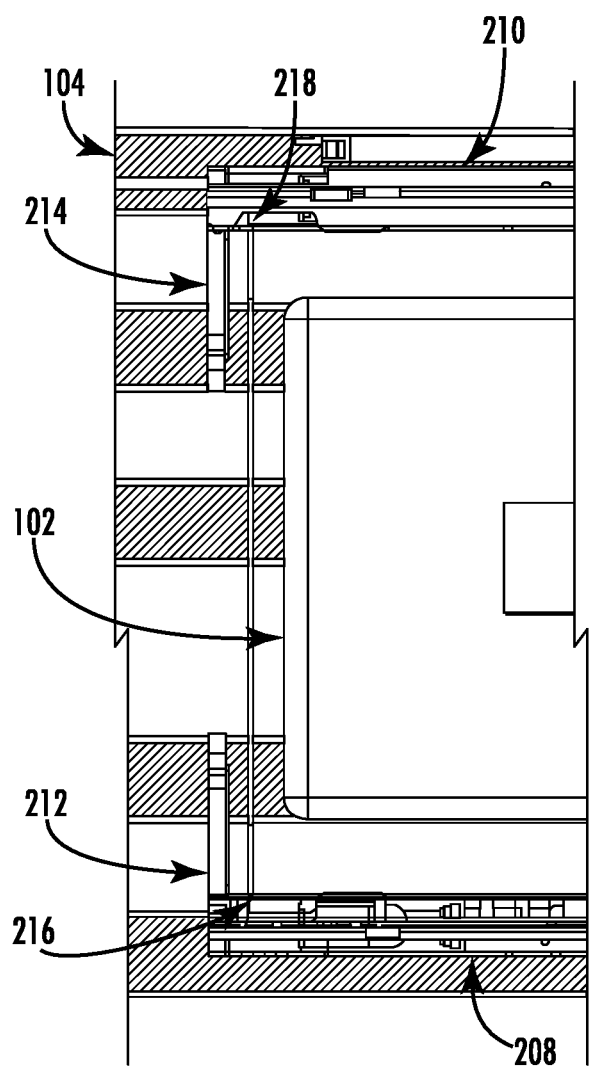
FIG. 6 illustrates a portion of the article retrieval device of FIGS. 3-5 with an associated sensing device in accordance with some example embodiments described herein.

As shown in FIGS. 5-6, the at least one engagement structure 212, 214 may be configured such that, in the deployed position, the first engagement structure 212 and the second engagement structure 214 may be positioned perpendicular with respect to the first loading arm 208 and the second loading arm 210, respectively. By way of continued example, once the pair of loading arms 202 are in an extended position, such as a first position proximate a first article for retrieval, the first engagement structure 212 may move relative the first loading arm 208, and the second engagement structure 214 may move relative the second loading arm 210. By way of example, the first engagement structure 212, in some embodiments, may be pivotally attached to the first loading arm 208 such that movement from the stored position to the deployed position provides for rotational movement of the first engagement structure 212 relative the first loading arm 208. Similarly, the second engagement structure 214, may be pivotally attached to the second loading arm 210 such that movement from the stored position to the deployed position provides for rotational movement of the second engagement structure 214 relative the first loading arm 210.

Although described and illustrated herein with reference to rotational movement of the engagement structures 212, 214, the present disclosure contemplates that the movement of the engagement structure 212, 214 between the stored and deployed positions may be effectuated via any mechanism or movement pattern as dictated by the application of the article retrieval device 200 and/or the article 102. For example, the present disclosure contemplates that the engagement structures 212, 214 may, in some embodiments, translate relative to the respective loading arm 202. Furthermore, the present disclosure contemplates that the engagement structures 212, 214 may be operably connected to one or more motors, rollers, or equivalent mechanisms for causing motion of engagement structures between the stored and deployed positions.

As shown in the deployed position of FIG. 5, the first engagement structure 212 may, in some embodiments, define a first pair of arms, and the second engagement structure 214 may define a second pair of arms. In this way, the first engagement structure 212 and the second engagement structure 214 may be collectively configured to bound the first article 102. Said differently, in order to cause movement (e.g., during retraction of the loading arms to the retracted position) of the article 102, the first and second engagement structure 212, 214 may define one or more fingers, extensions, flanged portions, etc. configured to contact the article 102. The present disclosure contemplates that the first engagement structure 212 and the second engagement structure 214 may be dimensioned (e.g., sized and shaped) based upon the intended application of the article retrieval device 200. Furthermore, although described and illustrated herein with a corresponding pair of engagement structures, the present disclosure contemplates that only a single engagement structure may similarly be used. For example, either the first loading arm 208 or the second loading arm 210, in some embodiments, may support a single engagement structure.

With reference to FIG. 6, the article retrieval device 200 may further include a sensing device 216, 218 coupled with the pair of loading arms 202. In order to determine if the engagement structures 212, 214 will properly engaged the article 102 the article retrieval device 200 may employ a sensing device as described hereafter. As described above, during operation one or more articles 102 housed by, for example, an ASRS system 100 may be mispositioned, dislodged, or the like such that the relative position of a particular article differs from the position at which the article was initially placed. In order to prevent unintended contact with an article in these instances and others, the sensing device (e.g., sensing elements 216, 218) of the present disclosure may be used to determine if the article 102 to be retrieved is within the path of the engagement structures 212, 214.

By way of example, an article 102 may be supported by a rack 104 at an angled positioned (e.g., as opposed to in-line with the support structure of the rack, parallel with the longitudinal edge of the rack 104, etc.). In such an example, absent the sensing device (e.g., sensing elements 216, 218 described herein), movement of the engagement structures 212, 214 may contact the article 102 resulting in damage to the article 102 and/or to the engagement structures 212, 214. As such, the sensing device may be configured to generate sensor data as described hereafter that is indicative of instances in which the sensing device is impeded.

As shown in FIG. 6, the sensing device may, in some embodiments, include a first sensing element 216 supported by the first loading arm 208 and a second sensing element 218 supported by the second loading arm 210. In such an embodiment, the sensing device may be a photoelectric sensor or photo eye that, via the first sensing element 216 and the second sensing element 218, is configured to generate sensor data. The sensing device may be, for example, a through-beam, retro-reflective, and/or diffuse-reflective photoelectric sensor that may detect the presence or absence of an article within the sensors via interruption of a beam of light transmitted by the sensing device. By way of a particular, non-limiting example, the first sensing element 216 may be an emitter element configured to generate light that is transmitted in the direction of the second sensing element 218 operating as a receiver element. In such an example, sensor data generated by the sensing device (e.g., sensing elements 216, 218) may indicate the presence of an object (e.g., the article 102) in an instance in which the light extending between the sensing elements 216, 218 is interrupted. In order to ensure accurate determinations, the first sensing elements 216 may be positioned on the first loading arm 208 in close proximity to the first engagement structure 212. Similarly, the second sensing element 218 may be positioned on the second loading arm 210 in close proximity to the second engagement structure 214. Although described herein with reference to an example photoelectronic sensor, the present disclosure contemplates that any sensing device (e.g., capacitive, inductive, magnetic, optical, radar, ultrasonic, hall effect, or the like) configured to determine the presence of an object may be used based upon the intended application of the article retrieval device 200.

Example Computing Device

As shown in FIG. 2, the article retrieval device 200 may include a computing device 300 that is operably coupled with the pair of loading arms 202, the at least one engagement structure 212, 214, and the sensing device 216, 218. In some instances, the frame 203 or other structure of the article retrieval device 200 may comprise or otherwise support the computing device 300, in whole or in part, such that the article retrieving device 200 is formed as a single, integrated device. In other embodiments, the computing device 300 may be operably coupled with the pair of loading arms 202, the at least one engagement structure 212, 214, and the sensing device 216, 218 via a network (not shown).

The computing device 300 may include circuitry, networked processors, or the like configured to perform some or all of the apparatus-based (e.g., article retrieval-based) processes described herein, and may be any suitable processing device and/or network server. In this regard, the computing device 300 may be embodied by any of a variety of devices. For example, the computing device 300 may be configured to receive/transmit data (e.g., article data, sensor data, etc.) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 7 and described in connection therewith. The computing device 300 may, in some embodiments, comprise several servers or computing devices performing interconnected and/or distributed functions. Despite the many arrangements contemplated herein, the computing device 300 is shown and described herein as a single computing device to avoid unnecessarily overcomplicating the disclosure.

As described above, in some instances, the computing device may be operably coupled with the pair of loading arms 202, the at least one engagement structure 212, 214, and the sensing device 216, 218 via a network. By way of example, the computing device 300 may be associated with a warehouse management system or central computing device configured to, in whole or in part, control operation of an ASRS system 100. In such an embodiment, the network may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network may include a public network, such as the Internet, a private network, such as an intranet, or combinations thereof, and may utilize a variety of networking protocols now available or later developed including, but not limited to TCP/IP based networking protocols. In some embodiments, the network may refer to a collection of wired connections such that the pair of loading arms 202, the at least one engagement structure 212, 214, and the sensing device 216, 218, and/or the computing device 300 may be physically connected, via one or more networking cables or the like.

Figure 7:
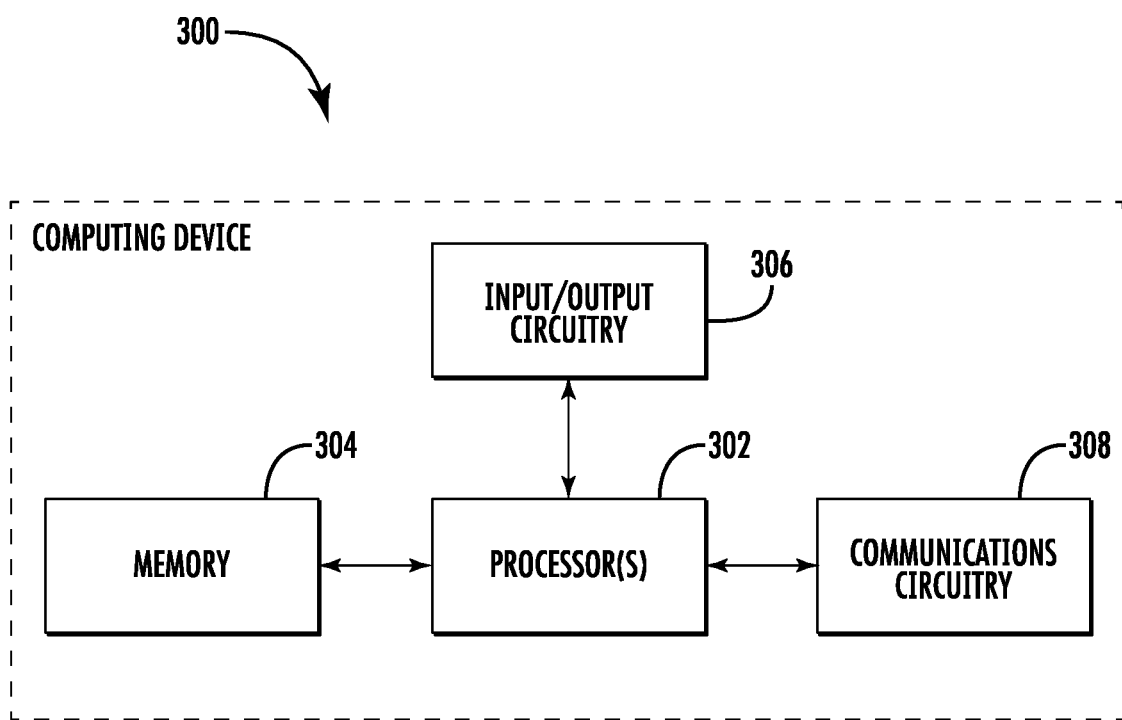
FIG. 7 illustrates a schematic block diagram of an example computing device that may perform various operations in accordance with some example embodiments described herein.

As illustrated in FIG. 7, the computing device 300 may include a processor 302, a memory 304, input/output circuitry 306, and communications circuitry 308. The computing device 300 may be configured to execute the operations described below in connection with FIGS. 8, 10, and 12. Although components 302-308 are described in some cases using functional language, it should be understood that the particular implementations necessarily include the use of particular hardware. It should also be understood that certain of these components 302-308 may include similar or common hardware. For example, two sets of circuitry may both leverage use of the same processor 302, memory 304, communications circuitry 308, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 300 may be housed within components of the article retrieval device 200. It will be understood in this regard that some of the components described in connection with the computing device 300 may be housed within one or more of the devices of FIGS. 1-6, while other components are housed within another of these devices, or by yet another device not expressly illustrated in FIGS. 1-6.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 300 may provide or supplement the functionality of particular circuitry.

In some embodiments, the processor 302 (and/or co-processor or any other processing circuitry assisting or otherwise associated with the processor) may be in communication with the memory 304 via a bus for passing information among components of the computing device 300. The memory 304 may be non-transitory and may include, for example, one or more volatile and/or non-volatile memories. In other words, for example, the memory may be an electronic storage device (e.g., a non-transitory computer readable storage medium). The memory 304 may be configured to store information, data, content, applications, instructions, or the like, for enabling the computing device 300 to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 302 may be configured to execute instructions stored in the memory 304 or otherwise accessible to the processor 302. Alternatively or additionally, the processor 302 may be configured to execute hard-coded functionality. As such, whether configured by hardware or by a combination of hardware with software, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure the processor 302 to perform the algorithms and/or operations described herein when the instructions are executed.

The computing device 300 further includes input/output circuitry 306 that may, in turn, be in communication with processor 302 to provide output to a user and to receive input from a user, user device, or another source. In this regard, the input/output circuitry 306 may comprise a display that may be manipulated by a mobile application. In some embodiments, the input/output circuitry 306 may also include additional functionality including a keyboard, a mouse, a joystick, a touch screen, touch areas, soft keys, a microphone, a speaker, or other input/output mechanisms. The processor 302 and/or user interface circuitry comprising the processor 302 may be configured to control one or more functions of a display through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the computing device 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 300.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Article Retrieval

Figure 8:
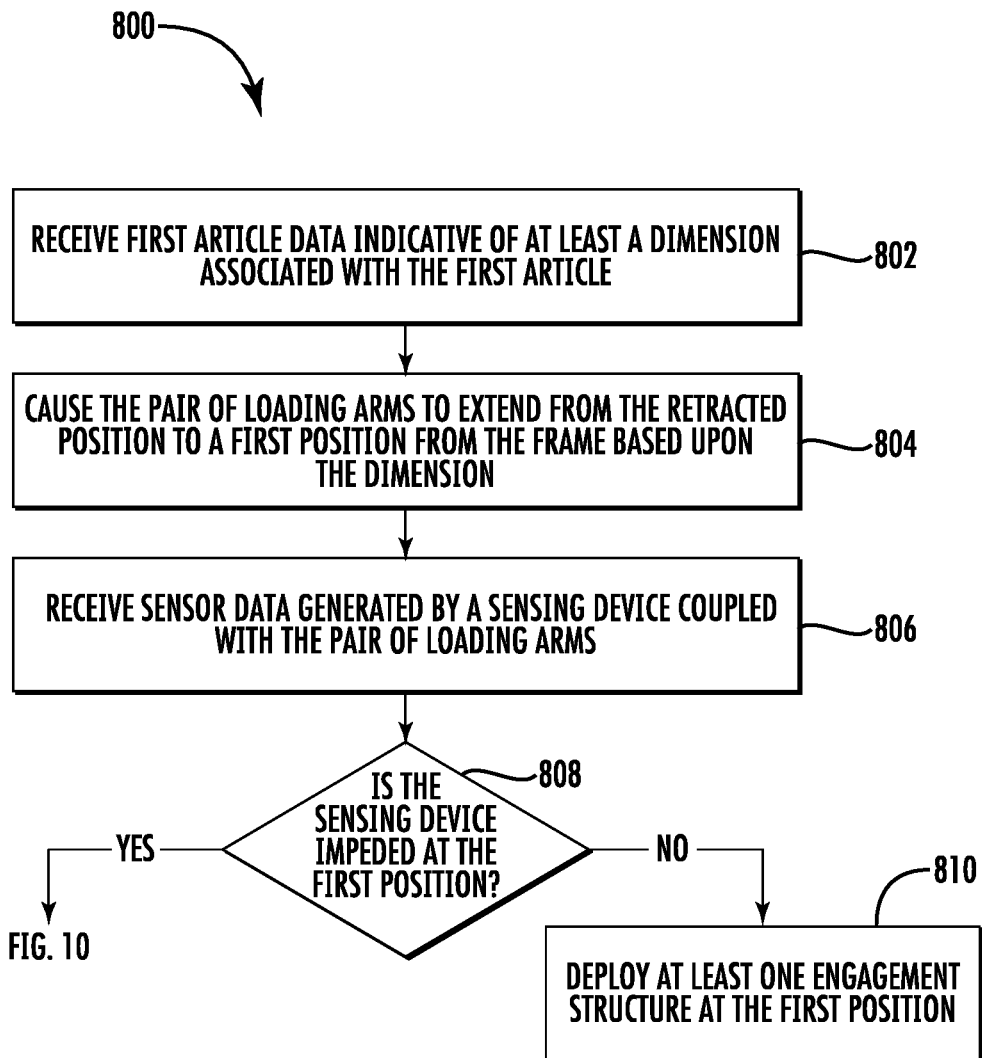
FIG. 8 illustrates an example flowchart for article retrieval, in accordance with some example embodiments described herein.
Figure 9A:
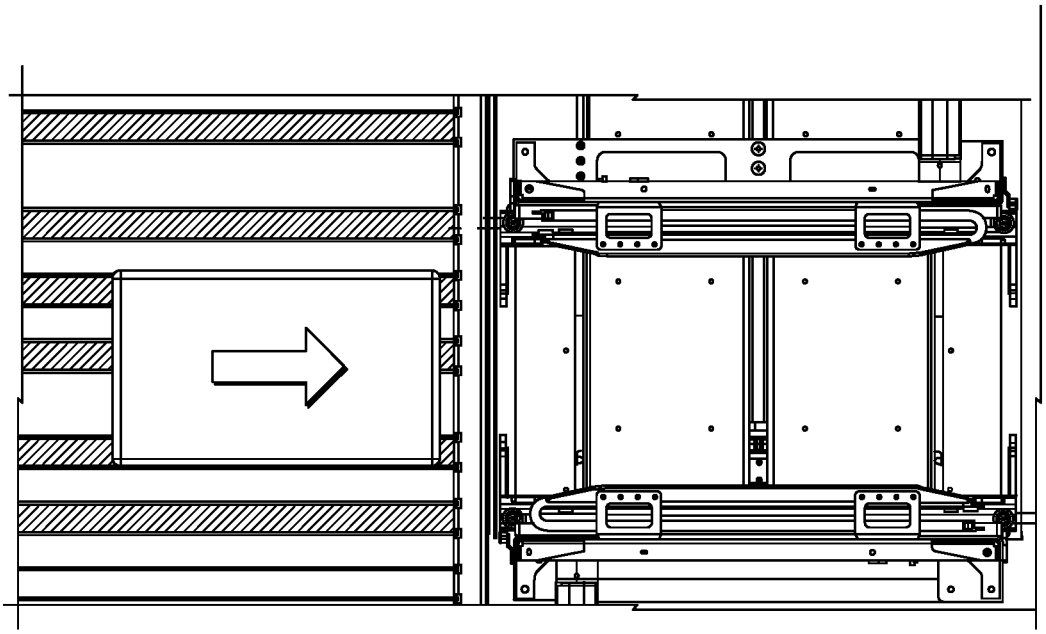
FIGS. 9A-9C illustrate the operations of the flowchart of FIG. 8.
Figure 9B:
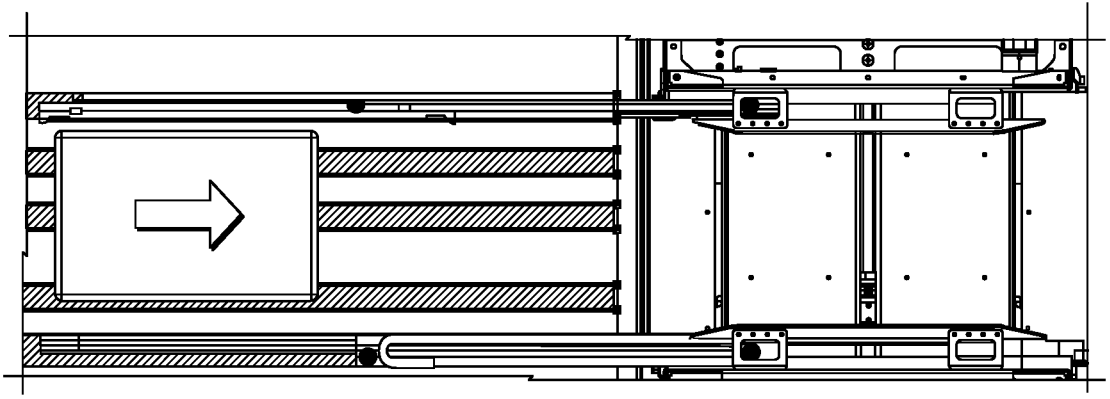
Figure 9C:
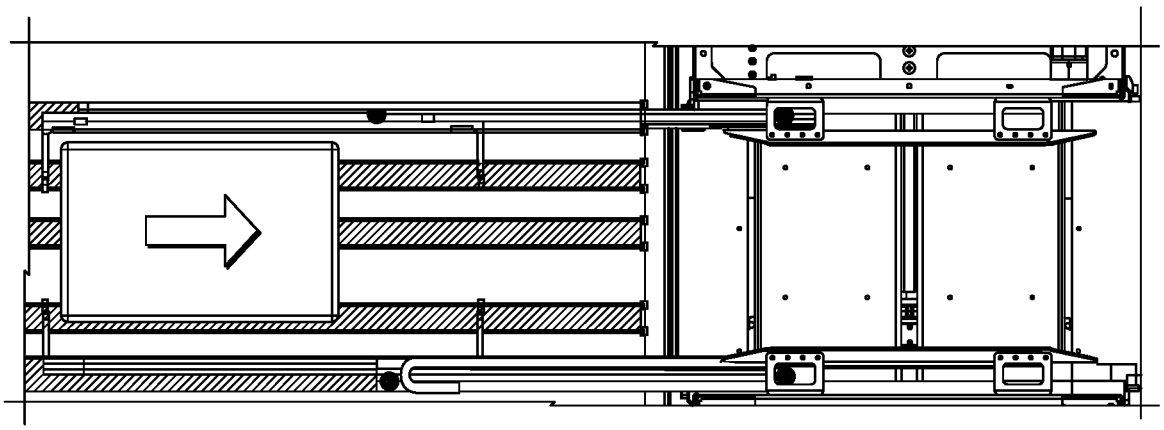

FIG. 8 illustrates a flowchart containing a series of operations for article retrieval. The operations illustrated in FIG. 8 may, for example, be performed by, with the assistance of, and/or under the control of an apparatus (e.g., computing device 300), as described above. In this regard, performance of the operations may invoke one or more of processor 302, memory 304, input/output circuitry 306, communications circuitry 308. FIGS. 9A-9C illustrate the operations of FIG. 8 as performed by the article retrieval device 200.

As shown in operation 802, the apparatus (e.g., computing device 300) includes means, such as processor 302, communications circuitry 308, or the like, for receiving first article data indicative of at least a dimension associated with the first article. As described above, the article retrieval device may be tasked with (e.g., receive instructions to) retrieve a first article. The first article may be positioned within a plurality of articles as part of a warehouse or equivalent environment. In some embodiments, the receipt of instructions to retrieve the first article may include first article data associated with the first article. For example, an operator associated with the system 100 may input a request to retrieve a first article and, as part of that request, may input first article data associated with the first article (e.g., the first article's relative position, dimensions, etc.). In other embodiments, the computing device 300 may have access to article data associated with a plurality of articles (e.g., stored in memory 304 or otherwise). As such, the receipt at operation 802 may refer to an internal communication of the computing device 300 to retrieve first article data associated with the first article.

As shown in operation 804, the apparatus (e.g., computing device 300) includes means, such as processor 302, communications circuitry 308, or the like, for causing the pair of loading arms to extend from the retracted position to a first position from the frame based upon the dimension. As detailed above, the first article data may include one or more data entries indicative of the relative location of the first article and/or the dimensions of the first article. As such, the computing device 300 may cause the article retrieval device to move about the environment within which it operations (e.g., an ASRS system) to a position proximate the first article as illustrated in FIG. 9A. At operation 804, the computing device 300 may cause the pair of loading arms to extend from the retracted position of FIG. 9A to a first position as illustrated in FIG. 9B in which the loading arms are located proximate the first article. Given that the article data associated with the first article includes data entries associated with the dimensions of the first article, the extension of the loading arms at operation 804 may be such that the pair of loading arms are located at a position that corresponds with the dimensions of the first article.

As shown in operations 806 and 808, the apparatus (e.g., computing device 300) includes means, such as processor 302, communications circuitry 308, or the like, for receiving sensor data generated by a sensor device coupled with the pair of loading arms and determining if the sensing device is impeded at the first position. As described above, the sensing device may, for example, be a photoelectric or other presence sensor configured to determine the presence of an article in instances in which the sensing device is impeded.

As such, the computing device 300 may, in some embodiments, iteratively receive sensor data from the sensing device indicating if the sensing device is currently impeded or unimpeded. In other embodiments, the computing device 300 may periodically query the sensing device for sensor data. In yet other embodiments, the computing device 300 may receive sensor data in an instance in which the computing device intends to cause deployment of the at least one engagement structure (e.g., at the first position). As such, the sensor data received at operation 806 may be analyzed by the computing device 300 (e.g., via processor 302 or otherwise) to determine if the sensing device is impeded at the first position.

In an instance in which the sensor data generated by the sensing device indicates that the sensing device is unimpeded as shown in operation 810, the apparatus (e.g., computing device 300) includes means, such as processor 302, communications circuitry 308, or the like, for deploying the at least one engagement structure as illustrated in FIG. 9C. When the sensor data generated by the sensing device indicates that the sensing device is unimpeded, in some embodiments, the computing device 300 may determine that the article is properly positioned (e.g., the dimensions and/or position received with the first article data are accurate) such that deployment of the at least one engagement structure will be properly positioned relative the first article. Said differently, the computing device may determine when the sensing device is unimpeded that the engagement structure will not collide with the article. The loading arms may be subsequently retracted to the position of FIG. 9A such that the first article is supported by the frame of the article retrieval device for further operations. In embodiments in which the sensor data generated by the sensing device indicates that the sensing device is impeded, the computing device may perform the operations of FIG. 10.

Figure 10:
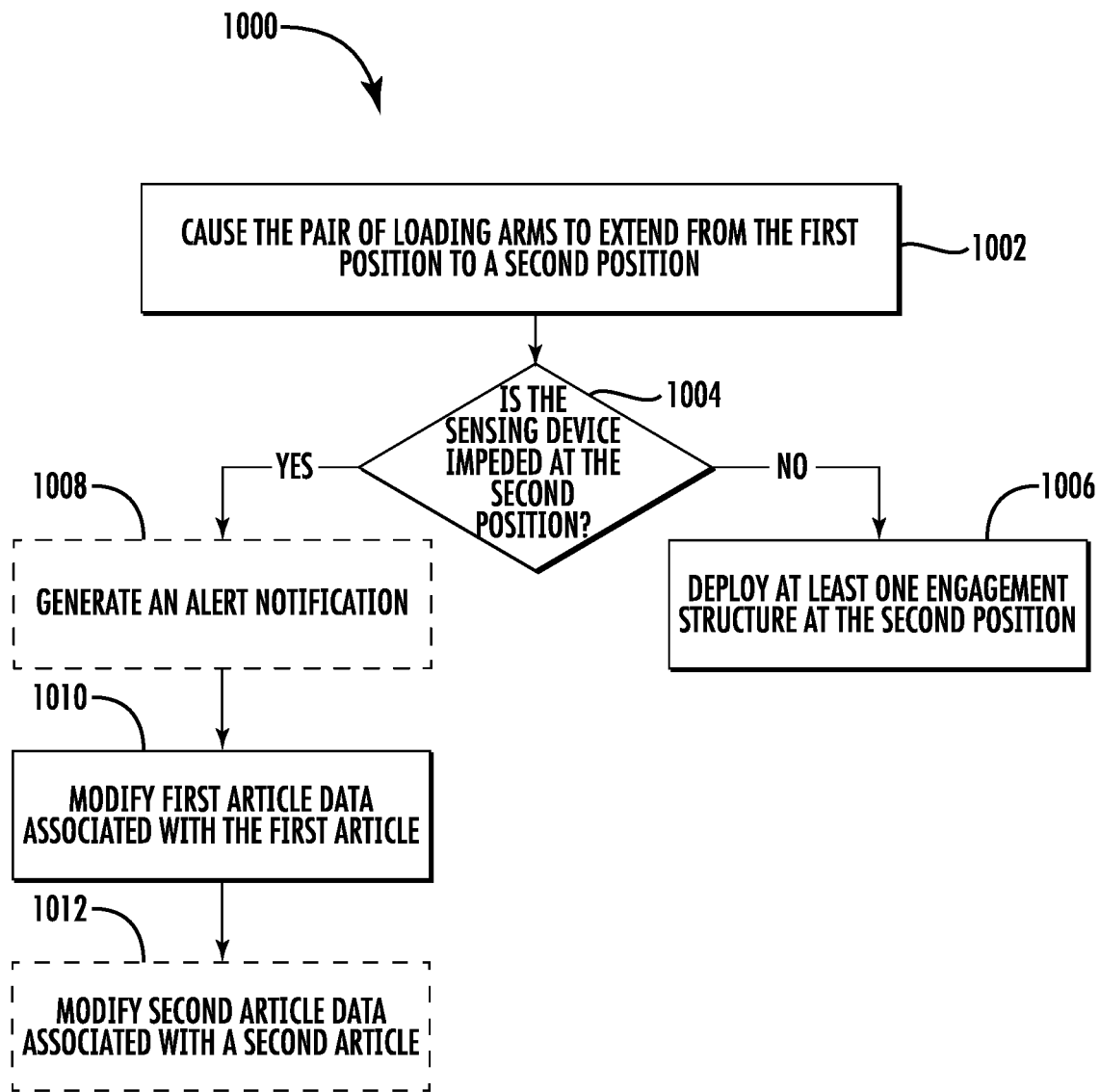
FIG. 10 illustrates an example flowchart for loading arm repositioning and article data modification in accordance with some example embodiments described herein.

FIG. 10 therefore illustrates a flowchart containing a series of operations for loading arm repositioning and article data modification. The operations illustrated in FIG. 10 may, for example, be performed by, with the assistance of, and/or under the control of an apparatus (e.g., computing device 300), as described above. In this regard, performance of the operations may invoke one or more of processor 302, memory 304, input/output circuitry 306, communications circuitry 308. FIGS. 11A-11D illustrate the operations of FIG. 10 as performed by the article retrieval device 200. As described above, in some instances as illustrated in FIGS. 11A-11B, extension of the pair of loading arms to the first position may result, due to mispositioning of the article or otherwise, in the first article blocking or impeding the sensing device. In such an instance, deployment of the engagement structure may result in damage to the first article and/or the engagement structure.

Figure 11A:
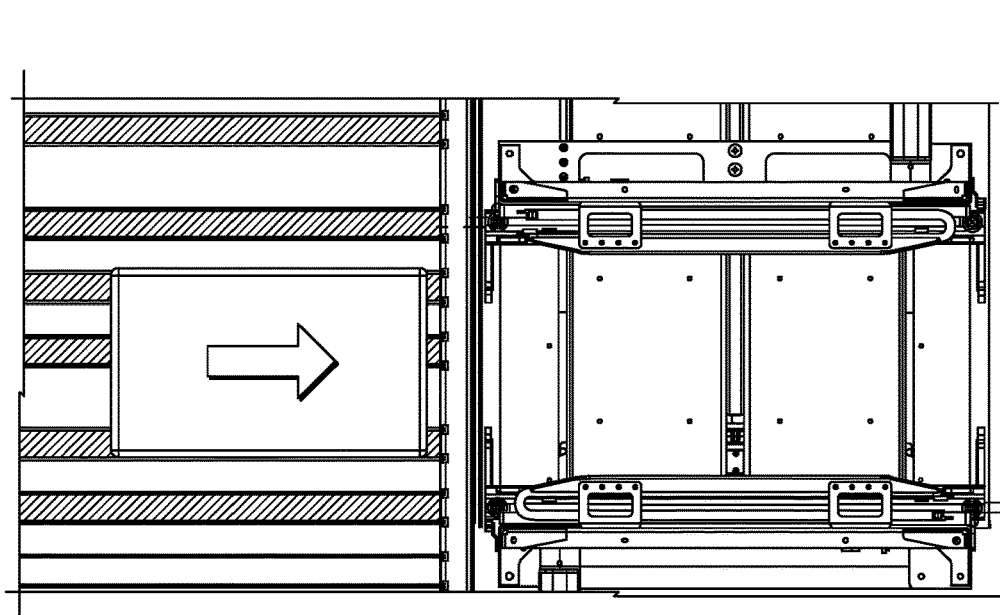
FIGS. 11A-11D illustrate the operations of the flowchart of FIG. 10.
Figure 11B:
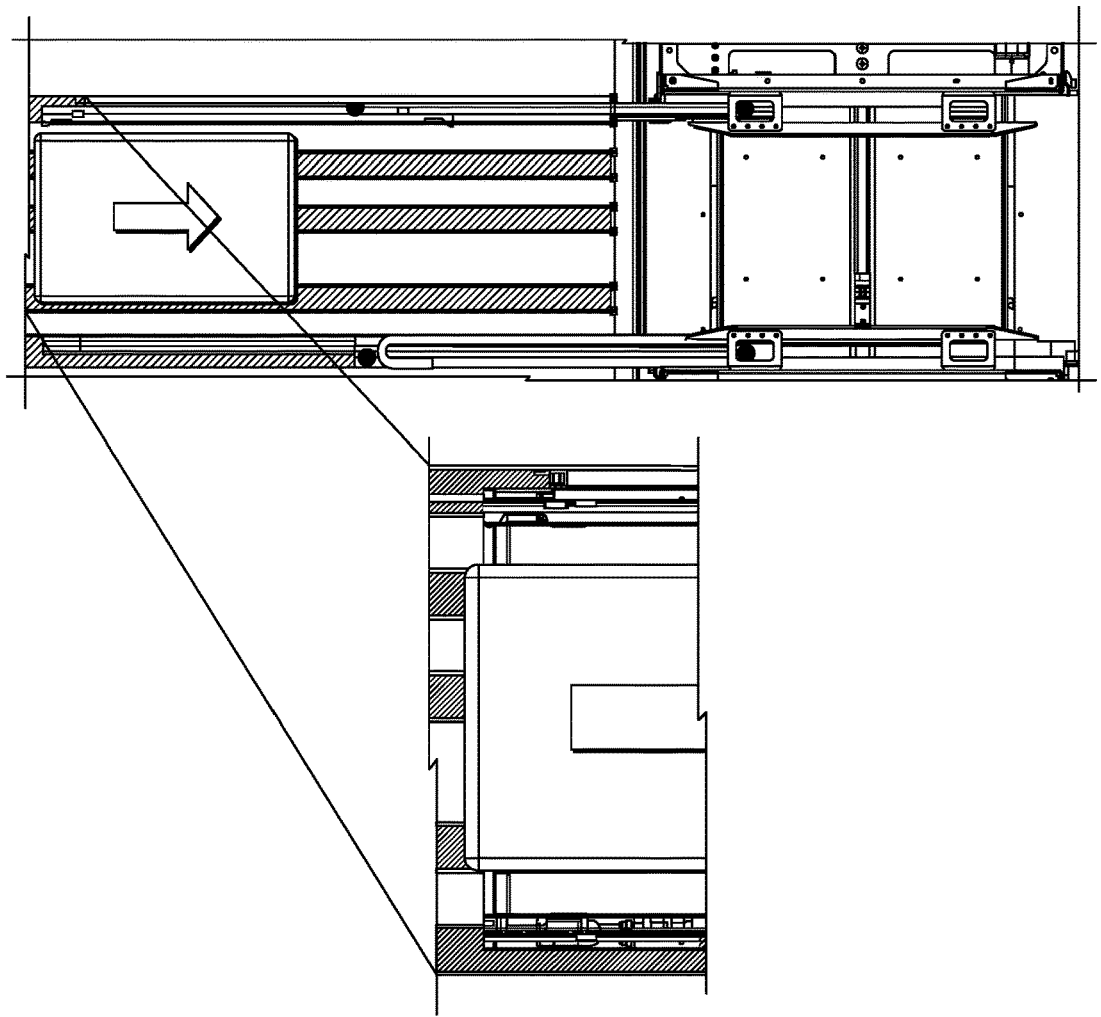
Figure 11C:
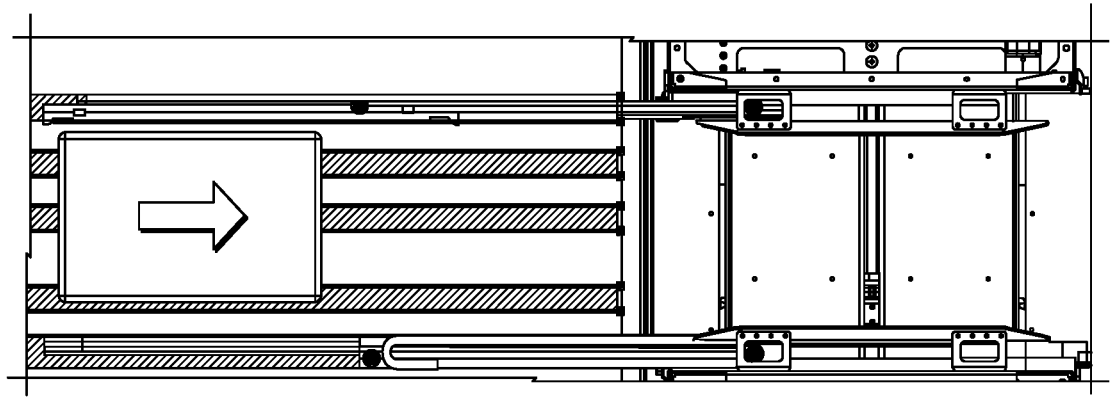

As such, as shown in operation 1002, the apparatus (e.g., computing device 300) includes means, such as processor 302, communications circuitry 308, or the like, for causing the pair of loading arms to extend from the first position to a second position from the frame that is greater than the first position as illustrated in FIG. 11C. The computing device 300 in FIG. 10 may operate to identify instances in which the sensing device is impeded such that deployment of the engagement structure is improper. The first position as described above may be determined based at least in part upon the dimension of the first article; however, the second position that is greater in distance from the frame than the first distance may be determined at least in part based upon the dimensions of the rack supporting the first article, in some embodiments. For example, the computing device 300 may have access to dimension data associated with the rack supporting the first article such that the computing device 300 may determine the amount of distance between the first position and the end of the rack (e.g., how much additional distance the loading arms may extend). As such, the second position of operation 1002 may be based at least in part based upon this remaining distance.

Although described herein with reference to a first position and a second position, the present disclosure contemplates that performance of the methods described herein may be iteratively performed before deployment of the at least one engagement structure. Said differently, a first performance of an example method for article retrieval may cause movement of the pair of loading arms to a first position, determine that the sensing device is impeded at the first position, and cause movement of the pair of loading arms to a second position. In some instances in which the sensing device is impeded at the second location, subsequent performance of the described method may occur in that the second position may operate as the first position. Said differently, the present disclosure contemplates that the pair of loading arms may be moved to any number of positions (e.g., a first position, a second position, . . . , a $n^{th}$ position) based upon the intended application of the system and article retrieval device and/or as required to identify a location at which the at least one engagement structure may be deployed unimpeded.

In other embodiments, the computing device 300 may cause the pair of loading arms to extend outwardly from the frame until the sensing device in unimpeded. In such an example, the second position may refer to the position at which the computing device receives sensor data from the sensing device indicating that the sending device is unimpeded. In other embodiments, the second position may refer to a determined incremental change in extension for the pair of loading arms (e.g., a defined change of 0.5 inches or the like). Said differently, in some embodiments, the change between the first position and the second position may be dictated based upon one or more inputs from an operator of the device 200, a system administrator, or one or more defined operating conditions. Still further, in some embodiments the distance between the first position and the second position may be determined based upon one or more prior iterations of the operations described herein. For example, the computing device 300 may leverage one or more machine learning techniques, artificial intelligence schemes, or the like in order to iteratively perform the operations of, for example, FIG. 8 in order to estimate the distance between the first position and the second position.

Figure 11D:
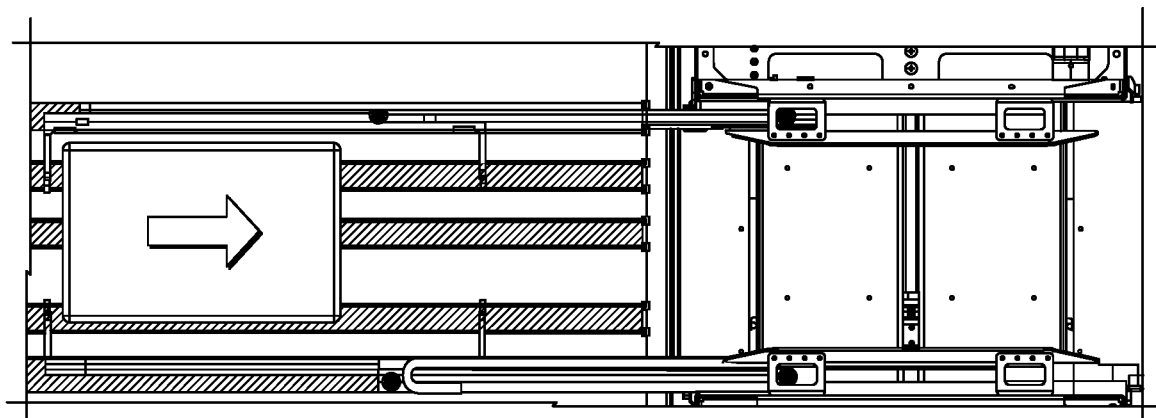

In an instance in which the sensor data generated by the sensing device indicates that the sensing device is unimpeded as shown in operation 1004, the apparatus (e.g., computing device 300) includes means, such as processor 302, communications circuitry 308, or the like, for deploying the at least one engagement structure as illustrated in FIG. 11D. As described above with reference to operation 810, when the sensor data generated by the sensing device indicates that the sensing device is unimpeded, in some embodiments, the computing device 300 may determine that the article is properly positioned (e.g., the dimensions and/or position received with the first article data are accurate) such that deployment of the at least one engagement structure will be properly positioned relative the first article.

In an instance in which the sensor data generated by the sensing device indicates that the sensing device is impeded at the second position, in some embodiments as shown in operation 1008, the apparatus (e.g., computing device 300)

includes means, such as processor 302, communications circuitry 308, or the like, for generating an alert notification. By way of continued example, the sensor data generated at the first position may indicate that the sensing device is impeded as described above. As such, the computing device 300 may determine that the first article is mispositioned and attempt to identify a subsequent position at which to deploy the engagement structure. If the computing device causes the loading arms to move to one or more second positions that are greater in distance from the frame than the first position and at such second positions the sensing device remains impeded, the computing device may determine that the first article is unable to be retrieved at its current position. To notify an operator or system administrator of this error in positioning, the computing device may generate an alert notification that includes one more data entries detailing the attempted retrieval operations.

Furthermore, as shown in operations 1010 and 1012, the apparatus (e.g., computing device 300) includes means, such as processor 302, communications circuitry 308, or the like, for modifying the first article data associated with the first article and, in some embodiments, modifying second article data associated with a second article. As detailed above, the determination of the first position may be based at least in part upon the first article data received by the computing device 300. After analyzing sensor data from the sensing device at the first position and determining that the sensing device is impeded, the computing device 300 may determine that the first article data is inaccurate in that the dimensions and/or location of the first article fails to align with the dimensions and/or location as defined by the first article data. As such, in some embodiments, the computing device 300 may modify the first article data to represent or otherwise account for any discrepancy. Furthermore, a mispositioning of the first article may result in or be indicative of a mispositioning of a second article adjacent the first article. By way of example, movement of the first article may cause the first article to contact the second article resulting in mispositioning of the second article. As such, the second article data associated with the second article may fail to account for the impact of the mispositioning of the first article on the second article. As shown in operation 1012, however, the computing device may operate to modify second article data associated with the dimensions and/or location of the second article such that attempts to retrieve the second article are not impacted by the mispositioning of the first article.

Figure 12:
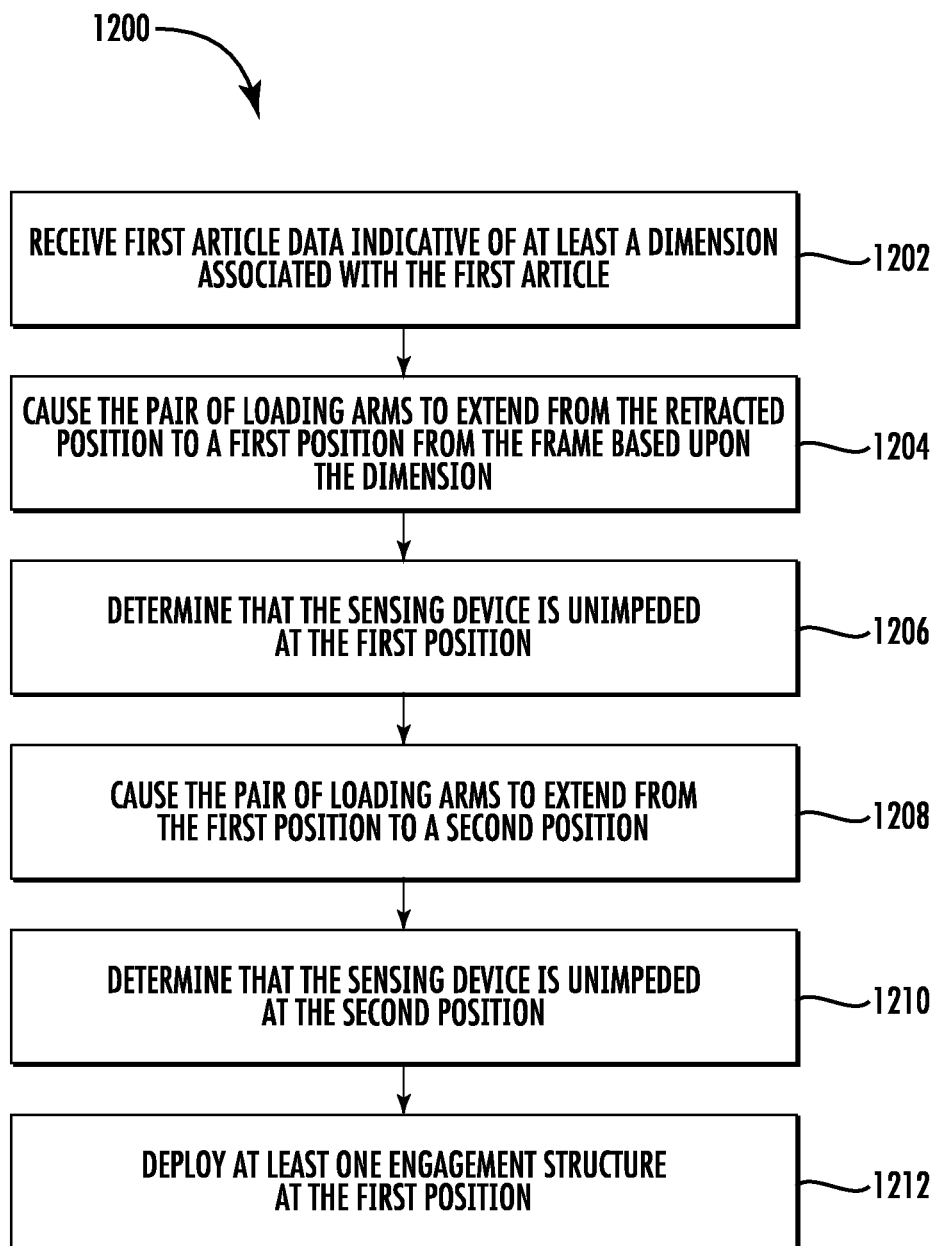
FIG. 12 illustrates an example flowchart for clearance related determinations in accordance with some example embodiments described herein.

FIG. 12 illustrates a flowchart containing a series of operations for clearance related determinations. The operations illustrated in FIG. 12 may, for example, be performed by, with the assistance of, and/or under the control of an apparatus (e.g., computing device 300), as described above. In this regard, performance of the operations may invoke one or more of processor 302, memory 304, input/output circuitry 306, communications circuitry 308.

As shown in operation 1202, the apparatus (e.g., computing device 300) includes means, such as processor 302, communications circuitry 308, or the like, for receiving first article data indicative of at least a dimension associated with the first article. As described above with reference to operation 802, the article retrieval device may receive instructions to retrieve a first article. The first article may be positioned within a plurality of articles as part of a warehouse environment. In some embodiments, the receipt of instructions to retrieve the first article may include first article data associated with the first article. For example, an operator associated with the system 100 may input a request to retrieve a first article and, as part of that request, may input first article data associated with the first article (e.g., the first article's relative position, dimensions, etc.). In other embodiments, the computing device 300 may have access to article data associated with a plurality of articles (e.g., stored in memory 304 or otherwise).

As shown in operation 1204, the apparatus (e.g., computing device 300) includes means, such as processor 302, communications circuitry 308, or the like, for causing the pair of loading arms to extend from the retracted position to a first position from the frame based upon the dimension. As detailed above with reference to operation 804, the first article data may include one or more data entries indicative of the relative location of the first article and/or the dimensions of the first article. As such, the computing device 300 may cause the article retrieval device to move about the environment within which it operations (e.g., an ASRS system) to a position proximate the first article. At operation 1204, the computing device 300 may cause the pair of loading arms to extend from the retracted position to a first position in which the loading arms are located proximate the first article. Given that the article data associated with the first article includes data entries associated with the dimensions of the first article, the extension of the loading arms at operation 1204 may be such that the pair of loading arms are located at a position that corresponds with the dimensions of the first article.

As shown in operation 1206, the apparatus (e.g., computing device 300) includes means, such as processor 302, communications circuitry 308, or the like, for determining that the sensing device is unimpeded at the first position. As described above, the sensing device may, for example, be a photoelectric or other presence sensor configured to determine the presence of an article in instances in which the sensing device is impeded. As such, the computing device 300 may, in some embodiments, iteratively receive sensor data from the sensing device indicating if the sensing device is currently impeded or unimpeded. Although the sensing device may be unimpeded at the first position, in some embodiments, the proximity of other articles, structures, elements, or the like may be such that deployment of the engagement structure will contact other articles, structures, elements, or the like. Said differently, although the sensing device may be unimpeded at the first position, clearance for deployment of the engagement structure may require further positional determinations.

As such, as shown in operation 1208, the apparatus (e.g., computing device 300) includes means, such as processor 302, communications circuitry 308, or the like, for causing the pair of loading arms to extend from the first position to a second position from the frame that is greater than the first position. In the embodiments of FIG. 12, the second position may be based at least in part on the distance or space required for proper deployment of the engagement structure. For example, if the sensing device is unimpeded at the first position, the computing device 300 may determine the second position as a position having a distance from that first position that allows for proper deployment of the engagement structure. By way of a particular, non-limiting example, if the engagement structure requires 0.5 inches of clearance for deployment, the second position at operation 1208 may be 0.5 inches greater in distance from the frame than the first position.

Thereafter, as shown in operations 1210 and 1212, the apparatus (e.g., computing device 300) includes means, such as processor 302, communications circuitry 308, or the like, for determining that the sensing device is unimpeded at the second position and deploying at least one engagement structure at the first position. As described above, the sensing device may generate sensor data at the second position that indicates that the sensing device is unimpeded at the second position. As such, the computing device 300 may determine that the clearance required for proper deployment of the engagement structure at the first position is present and subsequently deploy the at least one engagement structure as described above.

FIGS. 8, 10, and 12 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 304 of the computing device 300 and executed by a processor 302 of the computing device 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

The invention claimed is:

1. An article retrieval device comprising:
a frame;
a pair of loading arms movably attached to the frame, wherein the pair of loading arms are configured to move between:
 a retracted position proximate the frame; and
 an extended position in which a portion of the pair of loading arms extends at least partially beyond an outer edge of the frame;
at least one engagement structure movably attached to at least one of the pair of loading arms, wherein the at least one engagement structure is configured to move between a stored position and a deployed position;
a sensing device coupled with the pair of loading arms; and
a computing device operably coupled with the pair of loading arms, the at least one engagement structure, and the sensing device, wherein the computing device is configured to:
 cause the pair of loading arms to extend outwardly from the frame based on sensing data generated by the sensing device, wherein the pair of loading arms is outwardly extended from the retracted position to a first position proximate a first article; and
 deploy the at least one engagement structure from the pair of loading arms based upon sensor data generated by the sensing device;
in an instance in which the sensor data generated by the sensing device indicates that the sensing device is impeded when the pair of loading arms are in the first position, the computing device is further configured to:
 (i) cause the pair of loading arms to extend from the first position to a second position from the frame that is greater than the first position;
 (ii) in an instance in which the sensor data generated by the sensing device indicates that the sensing device is unimpeded when the pair of loading arms are in the second position, deploy the at least one engagement structure from the pair of loading arms; and
 (iii) in an instance in which the sensor data generated by the sensing device indicates that the sensing device is impeded when the pair of loading arms are in the second position, generate an alert notification.

2. The article retrieval device according to claim 1, wherein the pair of loading arms defines:
first loading arm; and
a second loading arm, wherein the second loading arm is substantially parallel with respect to the first loading arm.

3. The article retrieval device according to claim 2, wherein the sensing device further comprises:
first sensing element supported by the first loading arm; and
a second sensing element supported by the second loading arm.

4. The article retrieval device according to claim 2, wherein the at least one engagement structure comprises:
a first engagement structure movably attached to the first loading arm; and
a second engagement structure movably attached to the second loading arm.

5. The article retrieval device according to claim 4, wherein:
in the stored position, the first engagement structure and the second engagement structure are positioned substantially parallel with respect to the first loading arm and the second loading arm, respectively; and
in the deployed position, the first engagement structure and the second engagement structure are positioned substantially perpendicular with respect to the first loading arm and the second loading arm, respectively.

6. The article retrieval device according to claim 4, wherein the first engagement structure further defines a first pair of arms and the second engagement structure further defines a second pair of arms such that, in the deployed position, the first engagement structure and the second engagement structure are collectively configured to bound the first article.

7. The article retrieval device according to claim 1, wherein the sensing device comprises a photoelectric sensor.

8. The article retrieval device according to claim 1, wherein the computing device is further configured to:

receive first article data indicative of at least a dimension associated with the first article;
cause the pair of loading arms to extend from the retracted position to the first position from the frame based upon the dimension; and
deploy the at least one engagement structure from the pair of loading arms in an instance in which the sensor data generated by the sensing device indicates that the sensing device is unimpeded.

9. The article retrieval device according to claim 1, wherein the computing device is further configured to receive first article data indicative of at least a dimension associated with the first article, and
wherein, in an instance in which the sensor data generated by the sensing device indicates that the sensing device is impeded at the second position, the computing device is further configured to modify the first article data associated with the first article.

10. The article retrieval device according to claim 9, wherein, in the instance in which the sensor data generated by the sensing device indicates that the sensing device is impeded at the second position, the computing device is further configured to modify second article data associated with a second article.

11. The article retrieval device according to claim 1, wherein the computing device is further configured to:
receive first article data indicative of at least a dimension associated with the first article;
cause the pair of loading arms to extend from the retracted position to the first position from the frame based upon the dimension.

12. A method for article retrieval, the method comprising:
receiving first article data indicative of at least a dimension associated with a first article;
causing a pair of loading arms to extend outwardly from a frame based on sensing data generated by a sensing device, wherein the pair of loading arms is outwardly extended from a retracted position to a first position based upon the dimension, wherein the pair of loading arms are movably attached to the frame and configured to move between the retracted position proximate the frame and an extended position in which a portion of the pair of loading arms extends at least partially beyond an outer edge of the frame;
receiving sensor data generated by the sensing device coupled with the pair of loading arms;
deploying at least one engagement structure from the pair of loading arms in an instance in which the sensor data generated by the sensing device indicates that the sensing device is unimpeded, wherein the at least one engagement structure is movably attached to at least one of the pair of loading arms and is configured to move between a stored position and a deployed position; and
in response to the sensor data generated by the sensing device indicating that the sensing device is impeded when the pair of loading arms are in the first position:
(i) causing the pair of loading arms to extend from the first position to a second position from the frame that is greater than the first position;
(ii) in response to the sensor data generated by the sensing device indicating that the sensing device is unimpeded when the pair of loading arms are in the second position, deploy the at least one engagement structure from the pair of loading arms; and
(iii) in response to the sensor data generated by the sensing device indicating that the sensing device is impeded when the pair of loading arms are in the second position, generating an alert notification.

13. The method according to claim 12, in an instance in which the sensor data generated by the sensing device indicates that the sensing device is impeded at the second position, further comprising modifying the first article data associated with the first article.

14. The method according to claim 12, in an instance in which the sensor data generated by the sensing device indicates that the sensing device is impeded at the second position, further comprising modifying second article data associated with a second article.

15. A method for article retrieval, the method comprising:
receiving first article data indicative of at least a dimension associated with a first article;
causing a pair of loading arms to extend outwardly from a frame based on sensing data generated by a sensing device, wherein the pair of loading arms is outwardly extended from a retracted position to a first position based upon the dimension, wherein the pair of loading arms are movably attached to the frame and configured to move between the retracted position proximate the frame and an extended position in which a portion of the pair of loading arms extends at least partially beyond an outer edge of the frame;
determining, based upon the sensor data generated by the sensing device coupled with the pair of loading arms, that the sensing device is unimpeded at the first position;
causing the pair of loading arms to extend from the first position to a second position from the frame that is greater than the first position in an instance in which it is determined that the sensing device is unimpeded at the first position;
determining, based upon the sensor data generated by the sensing device, that the sensing device is unimpeded at the second position;
deploying at least one engagement structure at the first position in an instance in which it is determined that the sensing device is unimpeded at the second position, wherein the at least one engagement structure is movably attached to at least one of the pair of loading arms and is configured to move between a stored position and a deployed position; and
in response to the sensor data generated by the sensing device indicating that the sensing device is impeded when the pair of loading arms are in the first position:
(i) causing the pair of loading arms to extend from the first position to the second position from the frame that is greater than the first position;
(ii) in response to the sensor data generated by the sensing device indicating that the sensing device is unimpeded when the pair of loading arms are in the second position, deploy the at least one engagement structure from the pair of loading arms; and
(iii) in response to the sensor data generated by the sensing device indicating that the sensing device is impeded when the pair of loading arms are in the second position, generating an alert notification.

16. The method according to claim 15, wherein the sensing device comprises a photoelectric sensor.

* * * * *